Figure 1:
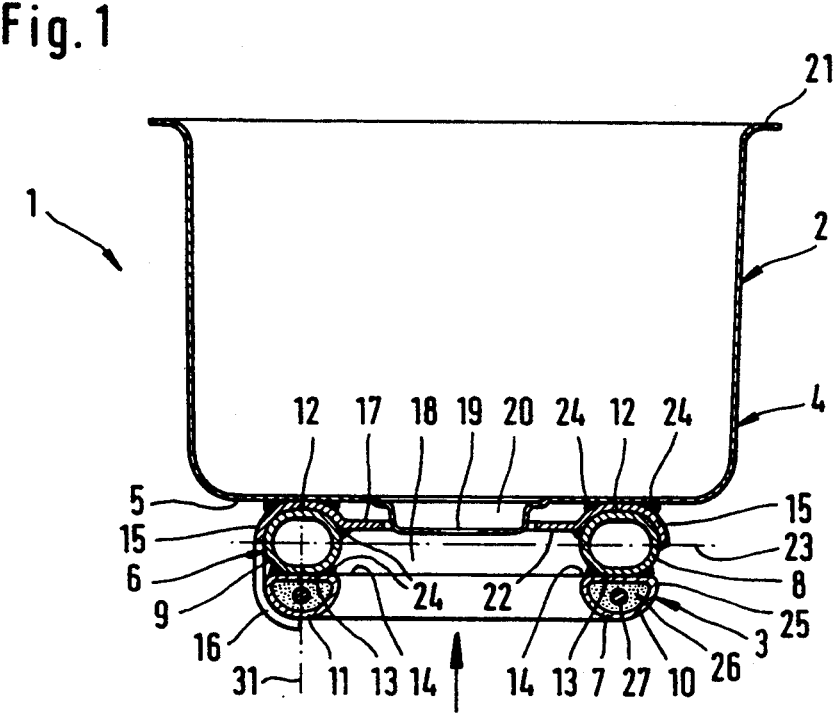

United States Patent

Hufnagl et al.

[11] Patent Number: 5,367,607
[45] Date of Patent: Nov. 22, 1994

[54] BREWED BEVERAGE MAKER WITH UNPRESSURIZED BOILER VESSEL STEAM GENERATOR TUBE AND COMMON HEATING ELEMENT

[75] Inventors: Walter Hufnagl, Sulzbach/Ts; Stefan Schamberg, Usingen; Gerhard Schäfer, Frankfurt am Main; Roland Müller, Dreieich-Offental; Manfred Klawuhn, Frankfurt am Main, all of Germany

[73] Assignee: Braun Aktiengesellschaft, Frankfurt, Germany

[21] Appl. No.: 944,063

[22] Filed: Sep. 11, 1992

[30] Foreign Application Priority Data

Sep. 13, 1991 [DE] Germany ............... 4130447

[51] Int. Cl.⁵ .................. A47J 31/00; F24H 1/10; H05B 3/00
[52] U.S. Cl. ........................... 392/465; 99/284; 99/288; 99/292; 99/300; 392/397; 392/405; 392/441; 392/480; 392/495
[58] Field of Search ............... 392/465, 467, 479, 480, 392/495, 444, 445, 441, 442, 397, 405; 99/279, 284, 288, 292, 293, 294, 300, 302 R

[56] References Cited

U.S. PATENT DOCUMENTS

| | | | |
|---|---|---|---|
| 2,114,661 | 4/1938 | West ........................... | 392/495 |
| 2,401,504 | 6/1946 | Paasche ........................ | 392/495 |
| 2,688,911 | 9/1954 | Hochmayer ................... | 99/302 R |
| 3,711,681 | 1/1973 | Leuschner et al. ............ | 392/467 |
| 3,953,923 | 5/1976 | Rygmyr . | |
| 4,095,086 | 6/1978 | Ohnmacht et al. ........... | 392/480 X |
| 4,760,774 | 8/1988 | Lin . | |
| 4,792,661 | 12/1988 | Schmidtchen et al. ....... | 392/495 |

FOREIGN PATENT DOCUMENTS

| | | | |
|---|---|---|---|
| 342516 | 11/1989 | European Pat. Off. ....... | 99/288 |
| 2091590 | 1/1972 | France . | |
| 2444437 | 7/1980 | France . | |
| 7015875 | 1/1971 | Germany . | |
| 2441825 | 3/1976 | Germany ..................... | 392/467 |
| 7602946 | 5/1976 | Germany . | |
| 2610784 | 9/1977 | Germany ..................... | 392/467 |
| 3132185 | 8/1981 | Germany . | |
| 3607173 | 10/1987 | Germany ..................... | 99/295 |
| 2091086 | 7/1982 | United Kingdom . | |

Primary Examiner—Anthony Bartis
Attorney, Agent, or Firm—Fish & Richardson

[57] ABSTRACT

An espresso coffee making system includes an unpressurized boiler vessel with an electric heating element arranged outside the boiler vessel for heating water in the boiler vessel for delivery to a perforated filter holder of the espresso coffee maker. A tube is provided between the electric heating element and the boiler vessel that is in thermal contact with both the heating element and the boiler vessel. A valve allows water from the boiler vessel to be recirculated by a pump through the tube to generate steam, without overheating the water contained in the boiler vessel.

19 Claims, 2 Drawing Sheets

U.S. Patent    Nov. 22, 1994    Sheet 1 of 2    5,367,607

BREWED BEVERAGE MAKER WITH UNPRESSURIZED BOILER VESSEL STEAM GENERATOR TUBE AND COMMON HEATING ELEMENT

This invention relates to an unpressurized boiler including an electric heating element for heating water that is used for producing brewed beverages.

A boiler of this type is known from GB-A-2 091 086. The boiler of this specification serves to heat water which is delivered to a pump whence it is pumped through a pipe into a perforated filter holder of an espresso maker. This arrangement has the disadvantage that the appliance is unable to produce steam which in espresso makers is in particular used also for frothing up the milk.

It is therefore an object of the present invention to provide an unpressurized boiler, preferably for an espresso maker, in which an electric heating element enables liquid to be heated and also steam to be produced which does not originate from water evaporated in the boiler.

According to the present invention, this object is accomplished in that the electric heating element is arranged outside the boiler, and a tube is provided between the electric heating element and the boiler through which the heating element is in thermal contact with the boiler, enabling preferably steam to be generated in the tube. This arrangement makes it possible to boil water in the boiler for one purpose, and to produce steam in the tube for another purpose. In the production of steam, this arrangement ensures that the predominant part of the heat issued by the heating element is already taken up in the steam tube. As a result, when steam is produced, boiling of the water contained in the boiler is prevented from occurring or is not allowed to occur until after steam has been produced for a period of time of some length.

On the other hand, the thermal coupling of the tube to the boiler—if no steam is produced in the tube—is sufficient to bring the water in the boiler to a boil sufficiently rapidly. This thus eliminates the need for an additional heating element to which the tube would be thermally coupled.

It will be understood that the tube may be provided on either the bottom or the side wall of the boiler. In lieu of producing steam, the tube may also be used for producing only hot water if correspondingly large quantities of cold water are fed therein and the amount of heat delivered by the heating element is insufficient for the formation of steam. In this manner, the espresso maker is also suitable for making tea, which is accomplished by pouring hot water into a cup provided with a tea bag, a tea ball or a strainer holding tea leaves.

To ensure a particularly uniform heat transfer from the heating element to the tube, the heating element is advantageously formed by a heater coil along which the tube is run. The heating element configured as a heater coil further affords the advantage of enabling a particularly high heating power to be applied to a particularly small area. To accomplish a particularly rapid and uniform heating of the water in the boiler, the tube is advantageously arranged at the bottom of the boiler. Whilst it can be considered that the tube with the heating element is provided on the side wall of the boiler in the proximity of the bottom, an optimum heat transfer is accomplished if the tube and the heating element are provided at the bottom outside the boiler.

By arranging the heater coil and the tube so as to extend along the bottom in U-shape, the legs of the tubes and of the heater coil do not cross each other, so that the supply connections of both the water tube and the electric heating element are readily accessible from the side.

To allow a best possible heat transfer from the heating element through the tube to the boiler, the upper side of the tube is advantageously in thermal contact with the bottom of the boiler, and the heater coil is in thermal contact with the underside of the tube opposite the upper side. This arrangement affords particular ease of manufacture. However, it can also be considered that the heating element and the tube are arranged in juxtaposed position on the bottom instead of being vertically disposed.

To maintain the heat transfer from the heating element to the tube and henceforth to the bottom as large as possible, the contact areas between heating element and tube and between tube and bottom are of a flat configuration.

Advantageously, a holding plate following the extent of the tube in substantial sections thereof is fastened to the bottom and has in turn fastened thereto the tube with the heating element, causing these to establish good thermal contact with the boiler. The holding plate increases the contact area, thus improving the heat transfer to the bottom of the boiler. By providing the holding plate with sheet-metal tabs embracing the tube and the heater coil from outside or inside in positive engagement therewith, supplementary clamping devices can be avoided, and if soldering is selected as an additional connecting method, the tube, the heating element and the boiler can be soldered together at their contact points with particular ease. By providing the holding plate with a sheet-metal section engaging in the free space formed between the two legs, electronic or electrical components such as control devices, temperature sensors, fuses, etc. can be fitted particularly easily. In this arrangement, the sheet-metal section may extend in one piece from one leg to the other leg, yet it may also be formed by individual sheet-metal tabs extending into the free space.

By maintaining a small distance between the bottom of the boiler and the sheet-metal section of the holding plate extending between the legs of the tube, no appreciable amount of heat is transferred to the bottom in this area. From this results the advantage that the heat generated by the heating element is conducted to the bottom largely through the tube, causing any temperature sensors that may be provided on the tube or the heating element or in their proximity to respond particularly rapidly, thereby enabling the temperature to be corrected within a minimum of time by causing the heating element to be turned on or off when the temperature falls below, or rises above, a predetermined value.

A particularly good heat transfer from the tube to the bottom of the boiler is accomplished by soldering the tube to the bottom. Where a holding plate is used, the holding plate is soldered to the bottom, and the tube is soldered to the holding plate. However, bonding the holding plate to the bottom of the boiler with a heat transfer compound, thus fastening it at the same time to the bottom, may also be contemplated. This ensures an equally good thermal contact while yet providing a simpler joining method. Good thermal contact while at the same time ensuring an intimate connection of tube, heating element and holding plate is established by soldering the tube, the heater coil and the holding plate at their respective points of contact and/or at the edges of their contact points. In this arrangement, the degree of joining depends on the desired degree of heat transfer to the tube and to the boiler.

To obtain a high heating power using a boiler of a relatively small cross-sectional area, the bottom of the boiler is of substantially rectangular cross section, with the legs of the tube and the legs of the heater coil extending along its long dimensions. This arrangement allows the use of a heater coil of maximum length, resulting in a sufficiently uniform heat distribution in the presence of a comparatively high heating power and in an overall low specific heat application to the arrangement.

To be able to withdraw hot water from the boiler, a tap is provided. The tap is advantageously arranged in a recess at the bottom of the boiler. The recess provides a collecting area in which even small amounts of remaining water collect which can be taken from the boiler to evacuate it completely following use.

In accordance with the invention, the boiler is suitable for use in an espresso maker having its tap connected with the inlet of a controllable electric reciprocating pump, the pump outlet delivering the hot water to a filter device adapted to receive coffee grinds, with the outlet of the reciprocating pump having the further option of being connected through a valve device with the tube, so that the water delivered to the tube may be used specifically for generating steam or, alternatively, for producing hot water, depending on the amount of water supplied. The use of the boiler of the invention in an espresso maker has the advantage that in the preparation of espresso it is no longer possible for overheated water to flow over the coffee grinds, which results in a bitter taste of the espresso beverage, lack of "crema" and the setting free of some undesired ethereal oils.

It is to be noted that overheated water may be produced in thermoblock-type espresso makers (DE-U-76 02 946.4) if the filter device holds finely ground and/or densely compressed coffee grinds offering major resistance to the pump located upstream of the thermoblock and delivering cold water, so that the water flow through the thermoblock is too slow, causing the water to be overheated, the temperatures exceeding easily 100° C. due to the increased pressure. By contrast, in the invention the water temperature can be maintained within very close limits of between 96° C. and 97° C., approximately, and when such water is delivered to the espresso coffee grinds contained in a perforated filter holder, overheating of the coffee grinds is prevented from occurring because the water cannot become overheated because of the open boiler, with the pump being then arranged downstream of the boiler.

If it is desired to generate steam with the boiler, in the use of a heating element with a heating power of about 1,100 watts, the reciprocating pump delivers to the tube a metered quantity of water of about 0.5 g per second, producing steam at a pressure and a temperature sufficiently high without causing the water in the boiler to start boiling. Owing to the arrangement of the tube between the heating element and the bottom of the boiler, a single heating element suffices both to heat the water in the boiler and to generate steam in the tube, without the water in the boiler starting to boil. As described initially in connection with the main claim, the tube may also be used for producing only hot water which is subsequently discharged from the steam exit nozzle of the espresso maker like the steam or may be withdrawn from a separate outlet. Hot water is produced if the amount of water fed to the heated tube is appreciably higher than needed for the generation of steam. In this manner, the espresso maker may also be used for preparing other brews such as tea, cocoa or even bouillon.

An embodiment of the present invention will now be described in more detail in the following with reference to the accompanying drawing. In the drawing, FIG. 1 is a transverse sectional view of a water boiler of the invention; and FIG. 2 is a bottom plan view of the water boiler of FIG. 1, as seen looking from the direction X of that Figure; and FIG. 3 is a diagrammatic view of an espresso maker system that incorporates the water boiler system shown in FIGS. 1 and 2.

Figure 2:
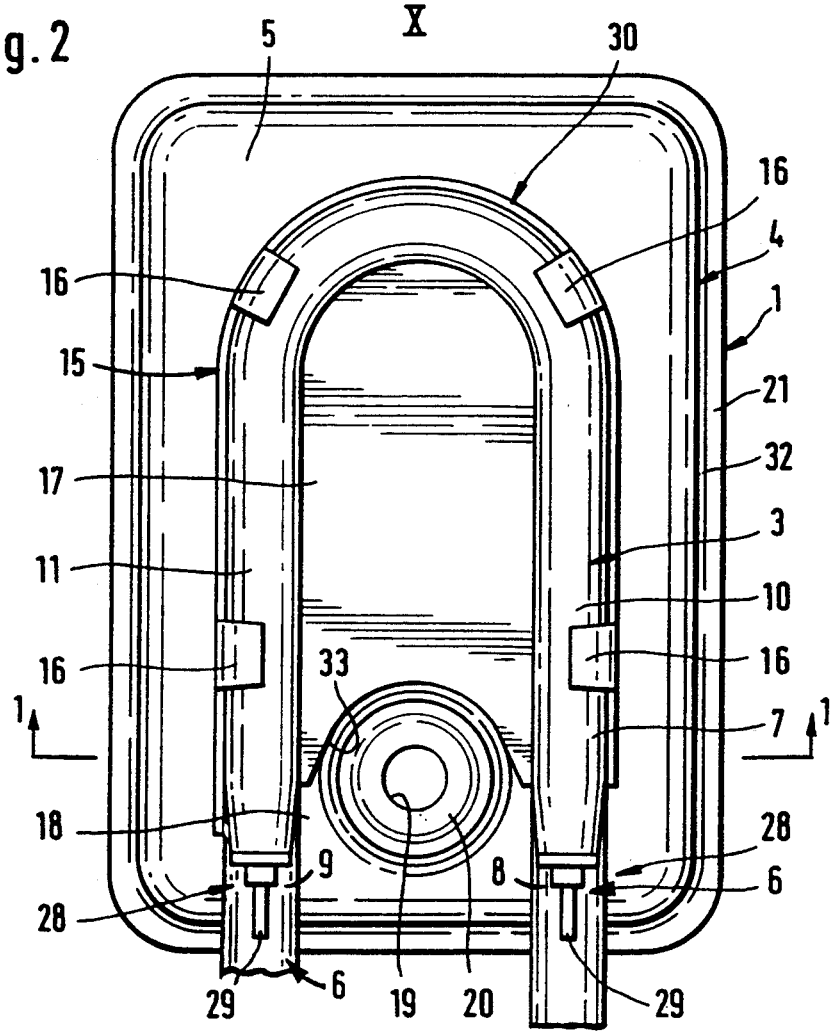
Figure 3:
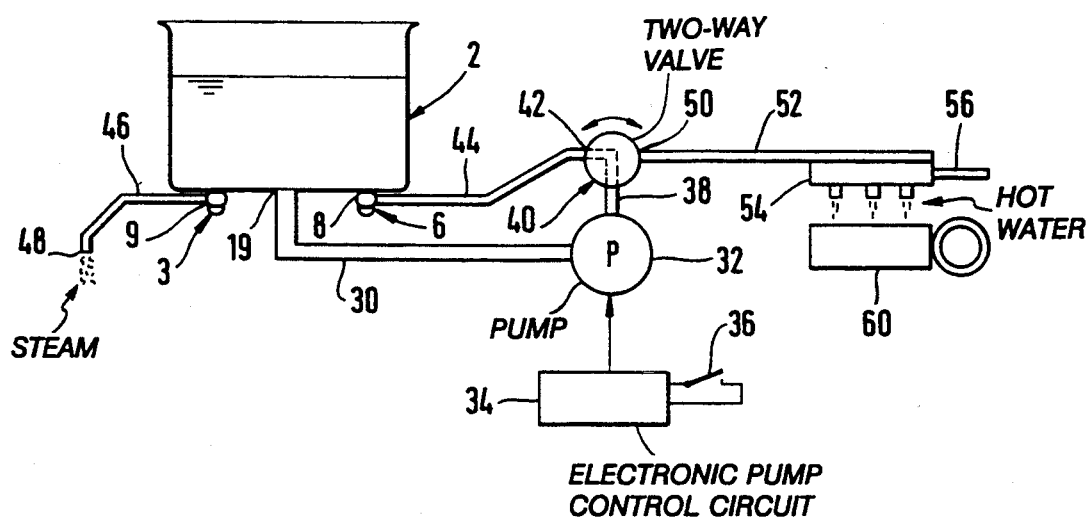

Referring now to FIGS. 1 and 2, the heating boiler 1 is comprised of a vessel 2 of rectangular cross section having its upper rim 21 rounded off in outward direction. On the underside 22 of the bottom 5, a holding plate 15 is fastened to the bottom 5 as, for example, by soldering or by means of a heat transfer compound, the holding plate having at its outer periphery sheet-metal tabs 16 extending vertically away from the bottom 5 and embracing from outside a U-shaped tube 6 and a subjacent heating element 3.

In FIGS. 1 and 2, the heating element 3 is formed by a heater coil 7 having its flattened upper side 14 joined to the underside 13 of the tube as, for example, by soldering, thereby establishing a good thermal conduction from the heating element 3 to the tube 6. The holding plate 15 rests snugly against the upper side 12 of the tube 6, extending up to about the horizontal center line 23 of the tube 6 in that area in which no sheet-metal tabs 16 are provided.

In FIGS. 1 and 2, the free space 18 bounded by the two legs 8, 9 is occupied by a sheet-metal section 17 extending at a distance to the underside 22 of the bottom 5 of the vessel 2. As becomes apparent from FIG. 1, the heating element 3, the tube 6 and the holding plate 15 have the edges of their respective contact points soldered together, as indicated by the soldering joints 24. Because the holding plate 15 is also soldered to the underside 22 of the bottom 5, soldering joints 24 will be recognized also in this area.

In FIG. 1, the heating element 3 is comprised of a heater coil 7 whose casing 25 is made of a metal conducting heat well as, for example, copper or aluminum. The casing 25 is filled with an insulating compound 26 within which the heater spiral 27 is embedded in an electrically insulating manner. Both the tube 6 and the holding plate 15 are fabricated of a material conducting heat well and corresponding preferably to the material of the heater coil 7. It is envisaged that both the holding plate 15 and the vessel 2 may also be made of stainless steel, welding or screw threading the holding plate to the bottom 5 of the vessel 2. Another possibility is to weld sheet-metal tabs 16 only to the bottom 5, which then serve the function of urging the soldered assembly of tube 6 and heater coil 7 against the bottom 5 to effect a good heat transfer.

In FIGS. 1 and 2, the bottom 5 of the vessel 2 has a recess 20 in which a tap 19 configured as an orifice is provided which is adapted to be connected to a conduit leading to a pump not shown in the drawing. As becomes apparent from FIG. 2, the U-shaped heater coil 7 has a right-hand and a left-hand leg 10, 11 having contact lugs 29 at the respective free ends 28 thereof to establish the connection to a source of electrical energy. The legs 8, 9 of the tube 6 extending above the legs 10, 11 as well as a section thereof providing a connection in semicircular form extend parallel to, and on the same axis 31 as, the heater coil 7.

In FIG. 2, the outer wall 4 of the vessel 2 is formed by a surface of rectangular cross section whose longer end walls 32 extend substantially parallel to and outside the legs of the tubes of the heating device 8, 9, 10, 11. As appears from FIG. 2, the sheet-metal section 17 extends around the recess 20 at its end 33 proximate to the contact lugs 29 to provide better access to the recess from below.

With reference to FIG. 3, tap 19 is connected by tube 30 to reciprocating pump 32 that is controlled by electronic circuit 34 and control switch 36. The outlet of pump 32 is connected by conduit 38 to the inlet of valve 40 that has a first outlet 42 connected by conduit 44 to the inlet leg 8 of tube 6. Outlet leg 9 of tube 6 is connected by conduit 46 to steam outlet 48. The second outlet 50 of valve 40 is connected by tube 52 to filter device 54 which has handle 56 for delivering a beverage to espresso cup 60. In use, when valve is in communication with outlet 42, reciprocating pump 32 delivers a metered quantity of water of about 0.5 grams per second to tube 6 so that steam is produced at outlet 48 at a pressure and temperature sufficiently high without causing the water in the boiler vessel 2 to start boiling. In the second position of valve 40 (in communication with outlet 50), hot water is delivered by pump 32 to the filter device 54 at a temperature which can be maintained within close limits of between 96° C. and 97° C. so that overheating of coffee grounds in filter device 54 is avoided.

While a particular embodiment of the invention of the invention has been shown and described, other embodiments will be apparent to those skilled in the art, and therefore, it is not intended to limit the invention to the disclosed embodiment, or to details thereof, and departures may be made therefrom within the spirit and scope of the invention.

What is claimed is:

1. A brewed beverage maker comprising,
unpressurized vessel structure for storing water for use in making a brewed beverage,
tube structure having an inlet and an outlet, said tube structure being disposed in thermal contact with a surface of said vessel structure,
said vessel structure having an outlet port, conduit structure connecting said outlet port with said inlet of said tube structure,
control structure for flowing liquid from said vessel structure through said outlet port and said conduit structure to said inlet of said tube structure, and
an electric heating element outside said vessel structure and in thermal contact with said tube structure so that said heating element is in direct thermal contact with said tube structure and in indirect thermal contact with said vessel structure, to enable steam to be generated in said tube structure from water flowed from said vessel structure through said conduit structure into said tube structure.

2. The beverage maker of claim 1 wherein said heating element includes a heater coil along which said tube structure extends.

3. The beverage maker of claim 1 and further including a controllable electric reciprocating pump having an inlet connected to said conduit structure, a first outlet adapted to deliver hot water to a filter device adapted to receive coffee grinds and a second outlet adapted to be connected to said tube structure so that water supplied to said tube structure may be used for generating steam or for producing hot water, depending on the amount of water supplied to said tube structure by said pump.

4. The beverage maker of claim 1 wherein said tube structure is arranged at the bottom of said vessel structure.

5. The beverage maker of claim 4 wherein said heater coil and said tube structure extend in U-shape, and include respective legs that extend in juxtaposed position in spaced relationship.

6. The beverage maker of claim 5 and further including solder structure securing said tube structure to said vessel structure.

7. The beverage maker of claim 5 wherein said vessel structure has a bottom portion of substantially rectangular area and said legs of said tube structure and said legs of said heater coil extend along the long dimensions of said rectangular area.

8. The beverage maker of claim 7 wherein said vessel structure has a bottom surface in which said outlet port is disposed and said bottom surface has an interior recess in the vicinity of said outlet port.

9. The beverage maker of claim 8 and further including a controllable electric reciprocating pump that has an inlet connected to said conduit structure, a first outlet adapted to deliver hot water to a filter device adapted to receive coffee grinds and a second outlet adapted to be connected to said tube structure so that water supplied to said tube structure may be used for generating steam or for producing hot water, depending on the amount of water supplied to said tube structure by said pump.

10. The beverage maker of claim 4 wherein said heating element includes a heater coil along which said tube structure extends, and said tube structure has an upper side in thermal contact with said bottom of said vessel structure and an under side opposite said upper side in thermal contact with said heater coil.

11. The beverage maker of claim 10 wherein said upper side and said under side of said tube structure are of flat configuration, and said heater coil has a flattened upper side in thermal contact with said under side of said tube structure.

12. The beverage maker of claim 1 and further including holding plate structure fastened to an outer surface of said vessel structure, said holding plate structure following the extent of said tube structure in substantial sections thereof and having fastened thereto said tube structure and said heating element.

13. The beverage maker of claim 12 wherein said holding plate structure includes sheet metal tabs that embrace said tube structure and said heater coil in positive engagement therewith, and said heating element is soldered to said tube structure.

14. The beverage maker of claim 12 wherein said heater coil and said tube structure extend in U-shape configuration and have respective legs extending in juxtaposed position, and said holding plate structure includes a sheet metal section disposed in the space between said legs of said heater coil.

15. The beverage maker of claim 14 wherein said sheet metal section is spaced from the adjacent surface of said vessel structure.

16. The beverage maker of claim 12 wherein said holding plate structure is soldered to the bottom of said vessel structure.

17. The beverage maker of claim 12 wherein said holding plate structure is fastened to the bottom of said vessel structure by a heat transfer compound.

18. The beverage maker of either claim 16 or 17 wherein said tube structure, said heater coil and said holding plate structure are soldered together at respective points of contact.

19. The beverage maker of claim 1 wherein said vessel structure has a bottom surface in which said outlet port is disposed and said bottom surface has an interior recess in the vicinity of said outlet port.

* * * * *

UNITED STATES PATENT AND TRADEMARK OFFICE
CERTIFICATE OF CORRECTION

PATENT NO.    : 5,367,607

DATED         : November 22, 1994

INVENTOR(S)   : Walter Hugnagl, et al.

It is certified that error appears in the above-identified patent and that said Letters Patent is hereby corrected as shown below:

Col. 4, line 14, replace ";and" with --taken along the line 1-1 of Fig. 2;--

Signed and Sealed this

Twenty-third Day of January, 1996

Attest:

BRUCE LEHMAN

Attesting Officer                Commissioner of Patents and Trademarks